(12) United States Patent
Kusumoto et al.

(10) Patent No.: US 7,034,643 B1
(45) Date of Patent: Apr. 25, 2006

(54) ELECTROMAGNETIC STARTER SWITCH

(75) Inventors: Keiichi Kusumoto, Tokyo (JP); Hayato Yamauchi, Tokyo (JP); Motoaki Kimura, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 11/182,773

(22) Filed: Jul. 18, 2005

(30) Foreign Application Priority Data

Mar. 22, 2005 (JP) .............................. 2005-081769

(51) Int. Cl.
*H01H 67/02* (2006.01)

(52) U.S. Cl. ....................................... 335/126; 335/131
(58) Field of Classification Search ................ 335/126, 335/131

See application file for complete search history.

(56) References Cited

U.S. PATENT DOCUMENTS 5,656,981 A * 8/1997 Niimi et al. ................. 335/126

2004/0168666 A1 * 9/2004 Nagai et al. ............ 123/179.25

FOREIGN PATENT DOCUMENTS

JP 7-109967 A 4/1995
JP 2004-190544 A 7/2004

\* cited by examiner

*Primary Examiner*—Lincoln Donovan
(74) *Attorney, Agent, or Firm*—Sughrue Mion, PLLC

(57) ABSTRACT

An electromagnetic starter switch in which a voltage from a power source is depressed by a resistor and applied to a motor by an auxiliary movable contact coming into contact with a first auxiliary fixed contact and a second auxiliary fixed contact before a pinion intermeshes with a ring gear, and the voltage from the power source is subsequently applied to the motor without modification by the main movable contact also coming into contact with a first main fixed contact and a second main fixed contact after the pinion intermeshes with the ring gear, wherein: a resistor is disposed between the first main fixed contact and the first auxiliary fixed contact or between the second main fixed contact and the second auxiliary fixed contact; and an electric current fuse is disposed between the second main fixed contact and the second auxiliary fixed contact or between the first main fixed contact and the first auxiliary fixed contact.

3 Claims, 5 Drawing Sheets

ELECTROMAGNETIC STARTER SWITCH

BACKGROUND OF THE INVENTION

1. Field of the Invention

The present invention relates to an electromagnetic starter switch for starting an internal combustion engine by means of a pinion driven by a motor.

2. Description of the Related Art

Conventionally, in electromagnetic starter switches, in order to control action of a motor during starting so as to be divided into two phases, there is provided: a main fixed contact; a main movable contact coming into contact with the main fixed contact; an auxiliary fixed contact; and an auxiliary movable contact coming into contact with the auxiliary fixed contact, a resistor being installed in series in a circuit formed when the auxiliary movable contact comes into contact with the auxiliary fixed contact such that an electric current from a battery flows through this closed circuit to an armature of the motor, rotating the armature at low speed to intermesh a pinion linked to the clutch with a ring gear.

Then, in a circuit formed when the main movable contact comes into contact with the main fixed contact, electric current from the battery flows through this closed circuit directly to the armature of the motor, and the motor rotates at a rated speed due to application of a rated voltage, starting an internal combustion engine. (See Patent Literature 1, for example.)

Patent Literature 1

Japanese Patent Laid-Open No. 2004-190544 (Gazette)

In an electromagnetic starter switch having the above configuration, after the auxiliary movable contact comes into contact with the auxiliary fixed contact, rotating the armature at low speed to intermesh the pinion fixed to the shaft of the motor with the ring gear, electric current from the battery should flow through the armature of the motor directly when the main movable contact comes into contact with the main fixed contact, but if for some reason the main movable contact does not come into contact with the main fixed contact, one problem has been that the temperature of the resistor may rise abnormally since electric current continues to flow through the resistor.

SUMMARY OF THE INVENTION

The present invention aims to solve the above problems and an object of the present invention is to provide an electromagnetic starter switch capable of preventing abnormal temperature increases in a resistor.

In order to achieve the above object, according to one aspect of the present invention, there is provided an electromagnetic starter switch for starting an internal combustion engine by means of a pinion driven by a motor intermeshing with a ring gear, the electromagnetic starter switch including: a solenoid case; a switch cover joined to a single side of an aperture portion of the solenoid case; a fixed core fixed inside the solenoid case; a main rod disposed inside the solenoid case and inside the switch cover so as to be able to reciprocate axially; a plunger that is contactable and separable relative to the fixed core, disposed so as to be slidable relative to the main rod; a first main fixed contact electrically connected to the motor, and a second main fixed contact electrically connected to a power source; a main movable contact disposed on the main rod so as to be contactable and separable relative to the first main fixed contact and the second main fixed contact; an auxiliary rod disposed so as to be coaxial with the main rod and capable of relative displacement; a coil fixed radially outside the fixed core such that when the coil is excited the coil moves the plunger in such a direction as to contact the fixed core; a first auxiliary fixed contact electrically connected to the first main fixed contact, and a second auxiliary fixed contact electrically connected to the second main fixed contact; a resistor disposed in one position selected from a position between the first main fixed contact and the first auxiliary fixed contact and a position between the second main fixed contact and the second auxiliary fixed contact; an overheating protecting means disposed in a position selected from the position between the first main fixed contact and the first auxiliary fixed contact and the position between the second main fixed contact and the second auxiliary fixed contact, the overheating protecting means protecting against overheating of the resistor; and an auxiliary movable contact disposed on the auxiliary rod so as to be contactable and separable relative to the first auxiliary fixed contact and the second auxiliary fixed contact, a voltage from the power source being depressed by the resistor and applied to the motor by the auxiliary movable contact coming into contact with the first auxiliary fixed contact and the second auxiliary fixed contact before the pinion intermeshes with the ring gear, and the voltage from the power source being subsequently applied to the motor without modification by the main movable contact also coming into contact with the first main fixed contact and the second main fixed contact after the pinion intermeshes with the ring gear.

Using an electromagnetic starter switch according to the present invention, abnormal temperature increases in the resistor can be prevented.

DETAILED DESCRIPTION OF THE PREFERRED EMBODIMENTS

Preferred embodiments of the present invention will now be explained with reference to the drawings.

Embodiment 1

Figure 1:
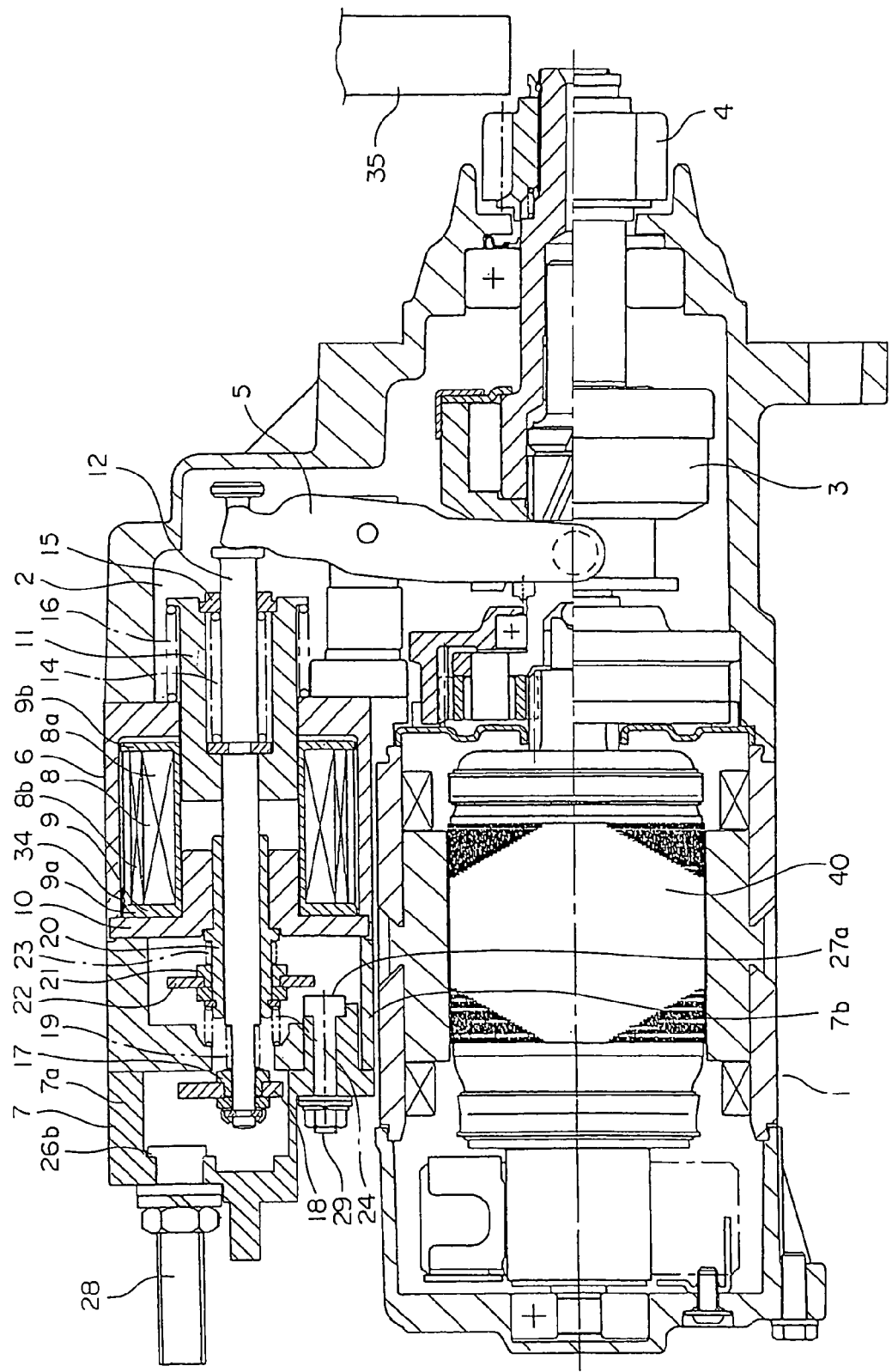
FIG. 1 is a cross section showing a starter in which an electromagnetic starter switch according to Embodiment 1 of the present invention is installed.
Figure 2:
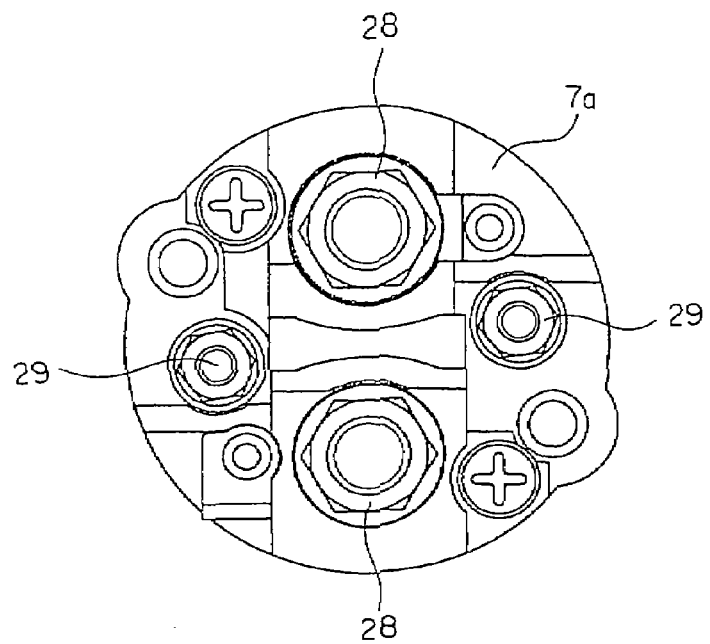
FIG. 2 is a diagram showing a main switch cover from FIG. 1 when viewed from a left side.
Figure 3:
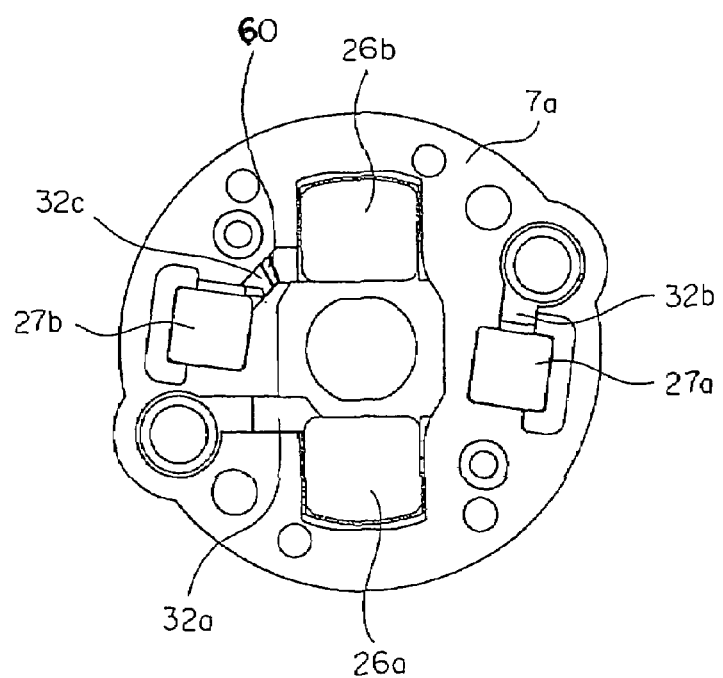
FIG. 3 is a rear end elevation showing the main switch cover in FIG. 2.

FIG. 1 is a cross section showing a starter according to Embodiment 1 of the present invention is installed, FIG. 2 is a diagram showing a main switch cover 7a from FIG. 1 when viewed from a left side, and FIG. 3 is a rear end elevation showing the main switch cover 7a in FIG. 2. Moreover, the cross section in the electromagnetic starter switch (hereinafter abbreviated to "electromagnetic switch") 2 in FIG. 1 is a cross section parallel to central axes of a second main fixed contact 26b and a first auxiliary fixed contact 27a.

This starter includes: a motor 1; an electromagnetic switch 2 for switching on and off passage of electric current to the motor 1; a clutch 3 that is movable axially along a shaft of the motor 1; a pinion 4 linked to the clutch 3 and rotating with the clutch 3; and a lever 5 rotatably disposed between the electromagnetic switch 2 and the clutch 3.

In the electromagnetic switch 2, a switch cover 7 is connected to an opening portion of a cylindrical solenoid case 6.

A cylindrical bobbin 9 having first and second flanges 9a and 9b on two end portions is disposed inside the solenoid case 6. Coils 8 constituted by a primary coil 8a, and a secondary coil 8b disposed outside the primary coil 8a, are mounted to outer peripheral portions of the bobbin 9. A fixed core 10 is joined to a portion of an inner wall surface of the bobbin 9 and an outer surface of the first flange 9a.

A reciprocally slidable cylindrical plunger 11 is inserted inside the bobbin 9 in a region on the right in FIG. 1. A main rod 12 capable of relative displacement axially relative to the plunger 11 is disposed on an axis of the cylindrical plunger 11. A ring 15 that is slidable relative to the main rod 12 is fixed to an end portion of the plunger 11 near the lever 5. A lever spring 14 is disposed between an outer peripheral surface of the main rod 12 and an inner peripheral surface of the plunger 11. A portion of the plunger 11 on the right in FIG. 1 projects outside the solenoid case 6. A separating spring 16 that forces the plunger 11 in a direction that separates the plunger 11 from the fixed core 10 is disposed between a flange of the plunger 11 and an end surface of the solenoid case 6.

A first end portion of the lever 5 is rotatably disposed on a first end portion of the main rod 12. A main holding member 17 that is capable of reciprocating axially is disposed on an outer peripheral surface of a second end portion of the main rod 12. A main movable contact 18 is fixed to the main holding member 17. A main contact pressure spring 19 that forces the main movable contact 18 away from the plunger 11 is disposed between the main holding member 17 and a stepped portion of the main rod 12.

An auxiliary rod 20 having a cylindrical shape that is slidable axially relative to the main rod 12 is disposed on an outer peripheral surface of an intermediate portion of the main rod 12. An auxiliary holding member 21 that is capable of reciprocating axially is disposed on an outer peripheral surface of the auxiliary rod 20. An auxiliary movable contact 22 is fixed to the auxiliary holding member 21. A first auxiliary contact pressure spring 23 that forces the auxiliary movable contact 22 away from the plunger 11 is disposed between the auxiliary holding member 21 and a stepped portion of the auxiliary rod 20.

Switch covers 7 are constituted by a main switch cover 7a and an auxiliary switch cover 7b. A second auxiliary contact pressure spring 24 that forces the auxiliary movable contact 22 toward the plunger 11 is disposed between an inner radial portion of the auxiliary switch cover 7b and the auxiliary holding member 21 so as to be radially outside the main contact pressure spring 19.

A first main fixed contact 26a and a second main fixed contact 26b are mounted to the main switch cover 7a facing the main movable contact 18. A first auxiliary fixed contact 27a and a second auxiliary fixed contact 27b are also mounted to the main switch cover 7a facing the auxiliary movable contact 22. Main terminals 28 are disposed continuously on the first main fixed contact 26a and the second main fixed contact 26b, respectively. Auxiliary terminals 29 are disposed continuously on the first auxiliary fixed contact 27a and the second auxiliary fixed contact 27b, respectively.

Figure 4:
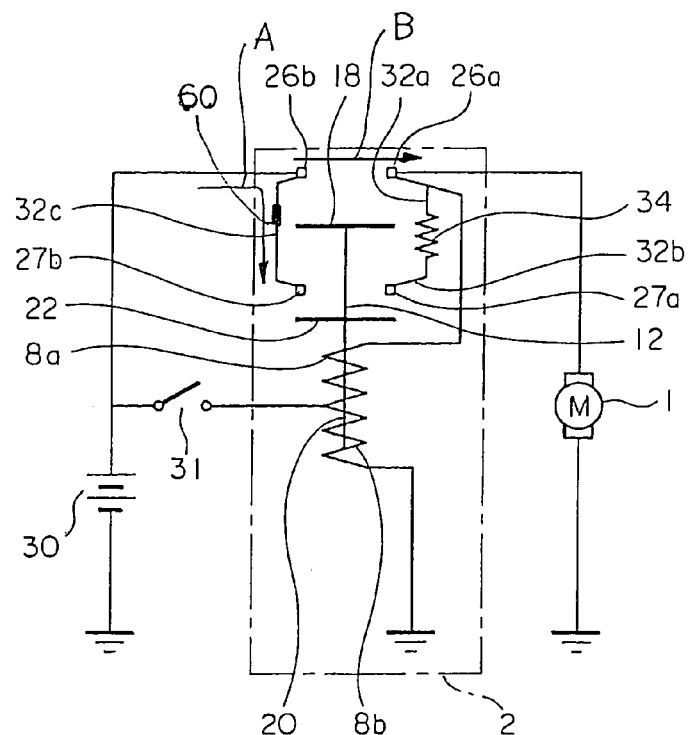
FIG. 4 is an electrical circuit diagram of the electromagnetic starter switch in FIG. 1.

FIG. 4 is an electrical circuit diagram of the electromagnetic switch shown in FIG. 1.

A battery 30 constituting a power source is electrically connected to the coils 8 of the electromagnetic switch 2 by means of a key switch 31. The primary coil 8a is connected to the first main fixed contact 26a. The first main fixed contact 26a is connected to a first end portion of a resistor 34 by means of a first connecting portion 32a. The resistor 34 has a zigzag shape, is composed of a copper-nickel alloy, and is affixed to an outer peripheral surface of the secondary coil 8b using an electrically-insulating tape. Moreover, the resistor 34 may also be affixed using an adhesive. A second end portion of the resistor 34 is connected to the first auxiliary fixed contact 27a by means of a second connecting portion 32b. The battery 30 is also connected to the second main fixed contact 26b. The second main fixed contact 26b is connected to the second auxiliary fixed contact 27b by means of a third connecting portion 32c.

An electric current fuse 60 constituting an overheating protecting means for protecting against overheating of the resistor 34 is disposed on this third connecting portion 32c.

Next, action of a starter having the above configuration will be explained.

When the key switch 31 is not closed, the plunger 11 is separated from the fixed core 10 by spring force from the separating spring 16, the main movable contact 18 is separated from the main fixed contacts 26a and 26b, and the auxiliary movable contact 22 is also separated from the auxiliary fixed contacts 27a and 27b. Because of this, electric current does not flow to the motor 1 from the battery 30.

When the key switch 31 is closed, the primary coil 8a and the secondary coil 8b are excited by passage of an electric current, the plunger 11 is attracted toward the fixed core 10, the main rod 12 and the auxiliary rod 20 also move together with the plunger 11 to the left in FIG. 1 against the elastic force of the separating spring 16, and the pinion 4 is pushed outward by means of the lever 5 such that side and end surfaces come into contact with a ring gear 35.

At this point in time, the auxiliary movable contact 22 first comes into contact with the auxiliary fixed contacts 27a and 27b, whereby electric current from the battery 30 flows in the direction of arrow A in FIG. 4, the rated voltage of the battery 30 is depressed by the resistor 34 and is applied to the motor 1, and the armature 40 of the motor 1 begins rotation at low speed. The rotation of the armature 40 is transmitted to the pinion 4 by means of the clutch 3. At this time, because the rotational torque from the motor 1 and the voltage of the battery 30 are depressed by the resistor 34, the torque of the motor 1 at the instant when the pinion 4 and the ring gear 35 intermesh with each other is minimized, reducing impact force during intermeshing. In addition, as the plunger 11 is attracted toward the fixed core 10, the pinion 4 reliably intermeshes with the ring gear 35, and first and second end portions of the main movable contact 18 come into contact with the first main fixed contact 26*a* and the second main fixed contact 26*b*, respectively. Here, because the resistor 34 is interposed in the circuit for the auxiliary movable contact 22, very little electric current flows through this circuit, and electric current from the battery 30 flows in the direction of arrow B in FIG. 4, the rated voltage of the battery 30 is applied to the motor 1 directly, and the motor 1 rotates at its rated speed due to application of the rated voltage, starting an internal combustion engine.

When the key switch 31 is released, passage of electric current to the primary coil 8*a* and the secondary coil 8*b* is cut off, the plunger 11 is separated from the fixed core 10 by the spring force from the separating spring 16, the main movable contact 18 is separated from the main fixed contacts 26*a* and 26*b*, and the auxiliary movable contact 22 is also separated from the auxiliary fixed contacts 27*a* and 27*b*, cutting off the passage of electric current to the motor 1. At the same time, the lever 5 linked to the main rod 12 pivots, releasing intermeshing between the pinion 4 and the ring gear 35.

Now, after the auxiliary movable contact 22 comes into contact with both the first auxiliary fixed contact 27*a* and the second auxiliary fixed contact 27*b*, rotating the armature 40 at low speed to intermesh the pinion 4 fixed to the shaft of the motor 1 with the ring gear 35, electric current from the battery 30 should flow through the armature 40 of the motor 1 directly when the main movable contact 18 comes into contact with both the first main fixed contact 26*a* and the second main fixed contact 26*b*, but if for some reason the main movable contact 18 does not come into contact with the first main fixed contact 26*a* and the second main fixed contact 26*b*, the electric current from the battery 30 may continue to flow through the resistor 34 as indicated by arrow A in FIG. 4.

In this case, because the electric current also continues to flow through the electric current fuse 60 disposed on the third connecting portion 32*c*, the electric current fuse 60 is melted by its own heat before the resistor 34 reaches a high temperature, preventing overheating of the resistor 34 because the passage of electric current to the resistor 34 is interrupted.

As explained above, in an electromagnetic switch having the above configuration, because an electric current fuse 60 protecting against overheating of the resistor 34 is disposed between the second main fixed contact 26*b* and the second auxiliary fixed contact 27*b*, abnormal temperature increases in the resistor 34 are prevented.

The electric current fuse 60 is used as an overheating protecting means, enabling abnormal temperature increases in the resistor 34 to be prevented by a simple configuration at low cost.

Because the first main fixed contact 26*a*, the second main fixed contact 26*b*, the first auxiliary fixed contact 27*a*, and the second auxiliary fixed contact 27*b* are disposed on the main switch cover 7*a* of the switch cover 7, positioning relative to the respective movable contacts 18 and 22 only needs to be performed once, enabling assembly man-hours to be reduced.

Because the electric current fuse 60 is also disposed on the main switch cover 7*a*, compared to if the electric current fuse were mounted outside the switch cover, mounting work is no longer necessary and the electric current fuse 60 is less likely to be affected by external environmental effects.

Because the resistor 34 is disposed on an outer peripheral surface of the tubular coils 8, the resistor 34 can be affixed to and held on the coils 8 simply using an electrically-insulating tape, for example.

Figure 5:
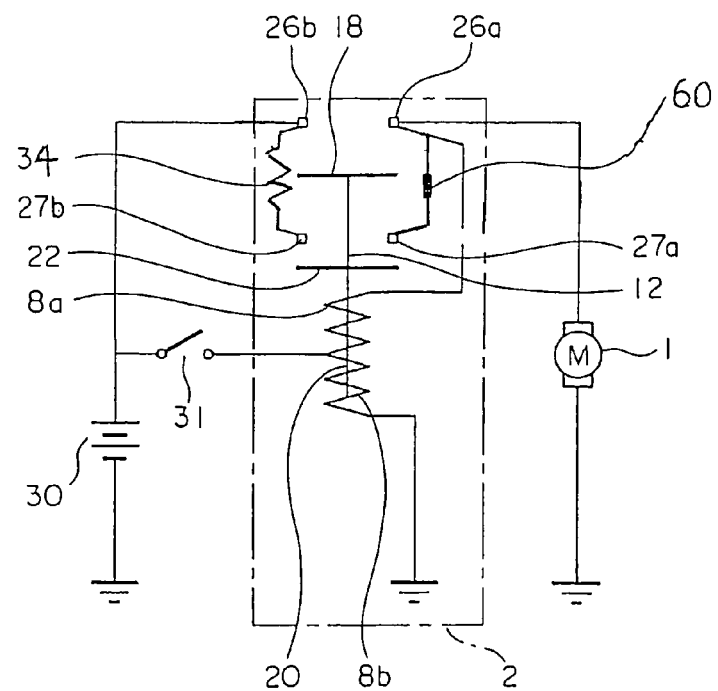
FIG. 5 is an electrical circuit diagram showing an example of an electromagnetic starter switch that differs from the electromagnetic starter switch in FIG. 1.
Figure 6:
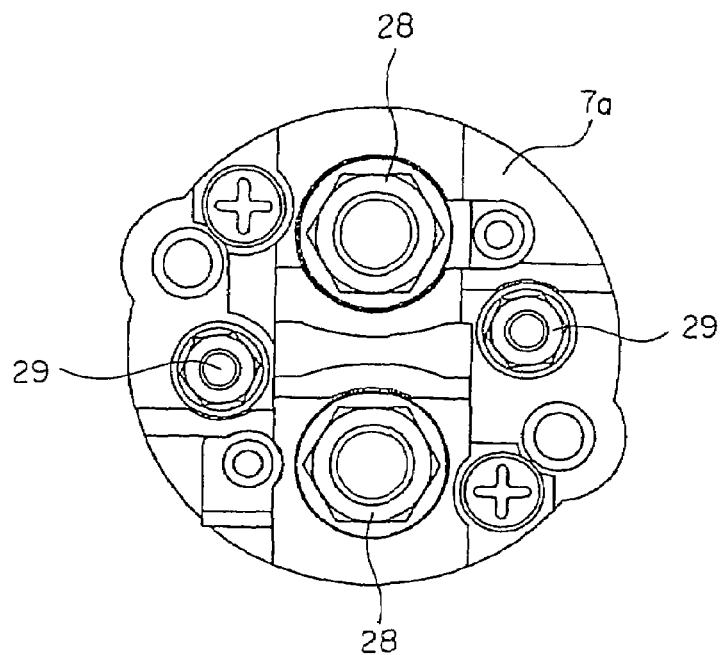
FIG. 6 is a diagram showing the main switch cover of the electromagnetic starter switch in FIG. 5 when viewed from outside.
Figure 7:
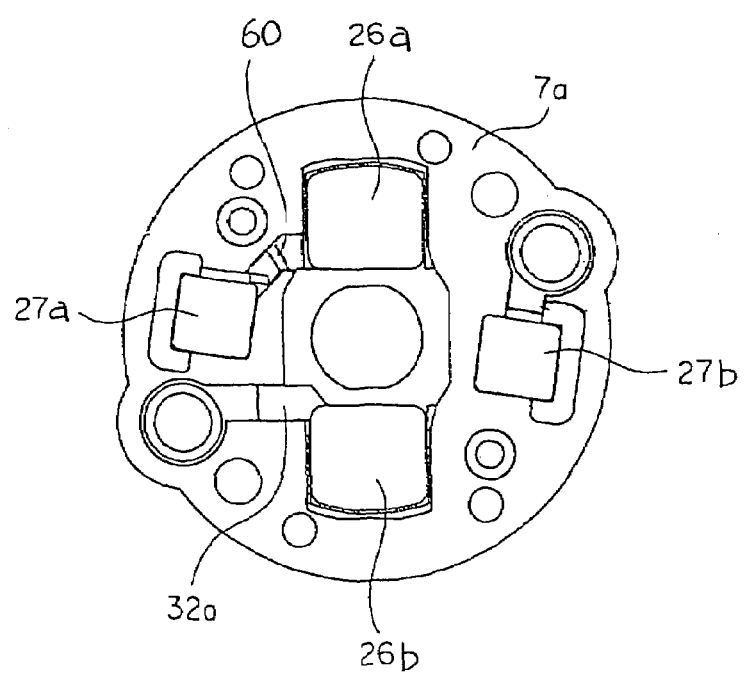
FIG. 7 is a diagram showing the main switch cover in FIG. 6 when viewed from inside.

Moreover, in the above embodiment, an electromagnetic switch has been explained in which the resistor 34 is connected between the first main fixed contact 26*a* and the first auxiliary fixed contact 27*a* and the electric current fuse 60 is disposed between the second main fixed contact 26*b* and the second auxiliary fixed contact 27*b*, but as shown in FIGS. 5 through 7, the present invention can also be applied to electromagnetic switches in which the resistor 34 is connected between the second main fixed contact 26*b* and the second auxiliary fixed contact 27*b* and the electric current fuse 60 is disposed between the first main fixed contact 26*a* and the first auxiliary fixed contact 27*a*.

Embodiment 2

Figure 8:
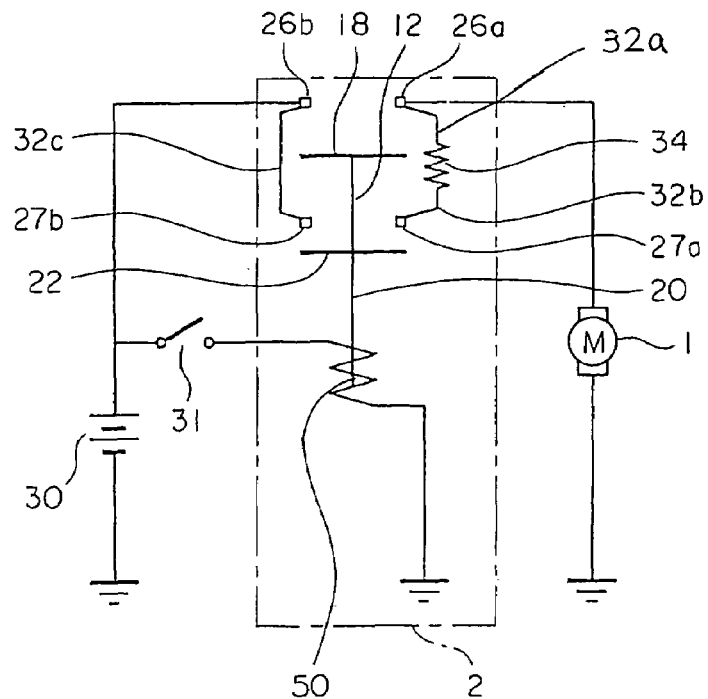
FIG. 8 is an electrical circuit diagram of an electromagnetic starter switch according to Embodiment 2 of the present invention.

FIG. 8 is an electrical circuit diagram for an electromagnetic switch in which a coil 50 is not separated into a primary coil and a secondary coil.

In the case of this configuration, a resistor 34 is connected between a first main fixed contact 26*a* and a first auxiliary fixed contact 27*a*, and an electric current fuse 60 is disposed between the second main fixed contact 26*b* and the second auxiliary fixed contact 27*b*, this embodiment also having similar effects to those of Embodiment 1.

Figure 9:
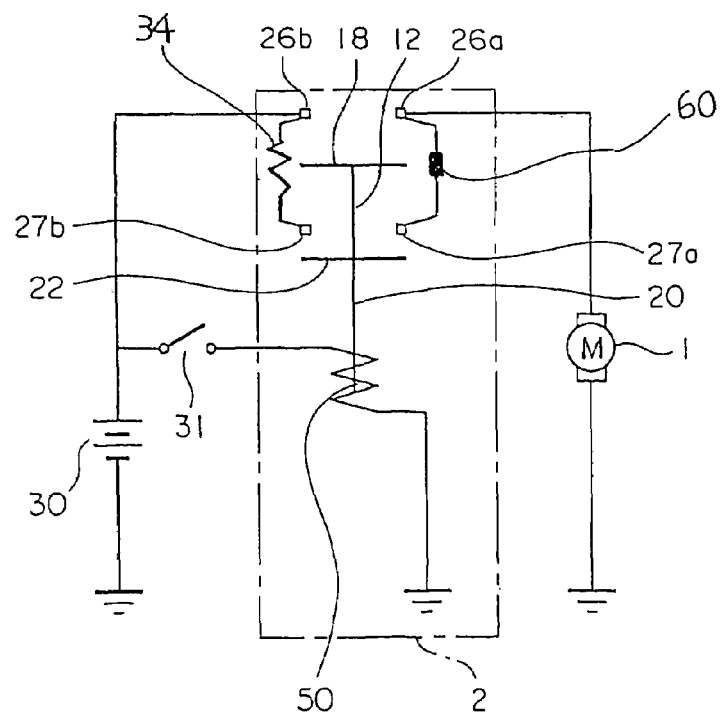
FIG. 9 is an electrical circuit diagram showing an example of an electromagnetic starter switch that differs from the electromagnetic starter switch in FIG. 8.

Of course, as shown in FIG. 9, the resistor 34 may also be connected between the second main fixed contact 26*b* and the second auxiliary fixed contact 27*b*, and the electric current fuse 60 disposed between the first main fixed contact 26*a* and the first auxiliary fixed contact 27*a*.

What is claimed is:

1. An electromagnetic starter switch for starting an internal combustion engine by means of a pinion driven by a motor intermeshing with a ring gear, said electromagnetic starter switch comprising:

a solenoid case;

a switch cover joined to a single side of an aperture portion of said solenoid case;

a fixed core fixed inside said solenoid case;

a main rod disposed inside said solenoid case and inside said switch cover so as to be able to reciprocate axially;

a plunger that is contactable and separable relative to said fixed core, disposed so as to be slidable relative to said main rod;

a first main fixed contact electrically connected to said motor, and a second main fixed contact electrically connected to a power source;

a main movable contact disposed on said main rod so as to be contactable and separable relative to said first main fixed contact and said second main fixed contact;

an auxiliary rod disposed so as to be coaxial with said main rod and capable of relative displacement;

a coil fixed radially outside said fixed core such that when said coil is excited said coil moves said plunger in such a direction as to contact said fixed core;

a first auxiliary fixed contact electrically connected to said first main fixed contact, and a second auxiliary fixed contact electrically connected to said second main fixed contact;

a resistor disposed in one position selected from a position between said first main fixed contact and said first auxiliary fixed contact and a position between said second main fixed contact and said second auxiliary fixed contact;

an overheating protecting means disposed in a position selected from said position between said first main fixed contact and said first auxiliary fixed contact and said position between said second main fixed contact and said second auxiliary fixed contact, said overheating protecting means protecting against overheating of said resistor; and an auxiliary movable contact disposed on said auxiliary rod so as to be contactable and separable relative to said first auxiliary fixed contact and said second auxiliary fixed contact, a voltage from said power source being depressed by said resistor and applied to said motor by said auxiliary movable contact coming into contact with said first auxiliary fixed contact and said second auxiliary fixed contact before said pinion intermeshes with said ring gear, and said voltage from said power source being subsequently applied to said motor without modification by said main movable contact also coming into contact with said first main fixed contact and said second main fixed contact after said pinion intermeshes with said ring gear.

2. The electromagnetic starter switch according to claim 1, wherein:

said overheating protecting means is an electric fuse.

3. The electromagnetic starter switch according to claim 2, wherein:

said electric fuse is disposed on said switch cover together with said first main fixed contact, said second main fixed contact, said first auxiliary fixed contact, and said second auxiliary fixed contact.

* * * * *